United States Patent [19]
Yutani et al.

[11] Patent Number: 5,444,484
[45] Date of Patent: Aug. 22, 1995

[54] SOLID-STATE IMAGING DEVICE

[75] Inventors: Naoki Yutani; Masafumi Kimata, both of Itami, Japan

[73] Assignee: Mitsubishi Denki Kabushiki Kaisha, Tokyo, Japan

[21] Appl. No.: 979,912

[22] Filed: Nov. 23, 1992

[30] Foreign Application Priority Data

Apr. 13, 1992 [JP] Japan .................... 4-92744

[51] Int. Cl.⁶ .................... H04N 5/335; H04N 3/14
[52] U.S. Cl. .................... 348/305; 348/317; 348/294; 348/302; 348/311
[58] Field of Search .................... 358/213.22, 213.13, 358/213.18, 213.25, 213.11, 213.29; H04N 3/14, 5/1335; 348/317, 302, 201, 294, 311

[56] References Cited

U.S. PATENT DOCUMENTS

| | | | |
|---|---|---|---|
| 4,392,158 | 7/1983 | Aoki et al. | 358/213 |
| 4,707,744 | 11/1987 | Kimata et al. | 358/213.26 |
| 4,866,292 | 9/1989 | Takemoto et al. | 250/578 |
| 5,019,911 | 5/1991 | Okino et al. | 358/213.19 |
| 5,027,217 | 6/1991 | Oshio et al. | 358/213.19 |
| 5,060,038 | 10/1991 | Kimata et al. | 357/24 |
| 5,187,584 | 2/1993 | Nishiki et al. | 358/213.18 |

FOREIGN PATENT DOCUMENTS 58-070683  4/1983  Japan ..................... H04N 3/14

OTHER PUBLICATIONS

Kimata et al., "A 512 ×512-Element PtSi Schottky-Barrier Infrared Imaging Sensor", IEEE Journal of Solid-State Circuits, vol. SC-22, No. 6, Dec. 1987, pp. 1124–1129.

Primary Examiner—Joseph Mancuso
Assistant Examiner—Bipin Shalwala
Attorney, Agent, or Firm—Leydig, Voit & Mayer

[57] ABSTRACT

A solid-state imaging device includes a two-dimensional array of photodetectors, a TG scanner outputting a selection pulse for reading out signal charges stored in the photodetectors, an interlace circuit receiving the selection pulse from said TG scanner and converting the selection pulse to a field storage mode operation pulse or to a frame storage mode operation pulse, and an interlace switching circuit receiving the pulse from said interlace circuit and switching the array of photodetectors between the field storage mode and the frame storage mode. The switching between the frame storage mode and the field storage mode is controlled by an external control signal. Therefore, the solid-state imaging device can select an optimum interlace system according to background conditions and the brightness and size of objects imaged.

4 Claims, 7 Drawing Sheets

SOLID-STATE IMAGING DEVICE

FIELD OF THE INVENTION

The present invention relates to a solid-state imaging device performing a line-addressing pixel selecting operation.

FIELD OF THE INVENTION

A solid-state imaging device comprising a photodetector array and a mechanism for reading out signal charges from the photodetector array has been developed. A solid-state visible light imaging device has been widely used for VTR cameras and the like. Meanwhile, a solid-state infrared imaging device using a silicon Schottky-barrier diode as an infrared detector and including a million pixels has been developed, and thus sufficient pixel number and sensitivity for practical use are realized.

Various kinds of charge readout systems have been proposed, and they are classified into two large groups, i.e., systems utilizing CCDs (Charge Coupled Devices) and systems utilizing MOS switches. An interline CCD system is a typical system utilizing the CCDs and a MOS system is a typical system utilizing MOS switches.

In the interline CCD system, a vertical CCD for transferring signal charges is disposed beside photodetectors. Although the interline CCD is a low-noise CCD, since the vertical CCD requires a large area sufficient to transfer a prescribed number of signal charges, the fill factor (the ratio of the photodetector area to the pixel size) cannot be increased, resulting in a poor sensitivity. In addition, the maximum amount of signal charges handled by the interline CCD is small. On the other hand, the MOS system includes only MOS switches and wiring, besides photodetectors, so that the fill factor can be increased by reducing the area occupied by the MOS switches and wiring, resulting in an improved sensitivity. In addition, the maximum quantity of signal charges handled by the MOS system is large. However, the MOS system unfavorably produces noise.

As a system solving the above-described problems of the interline CCD system and the MOS system, a CSD system utilizing a CSD (Charge Sweep Device) in place of the vertical CCD of the interline CCD system has been proposed. In the CSD system, the line-addressing pixel selecting operation of the MOS system is employed while keeping the low-noise property of the CCD system, whereby a large maximum charge and a large fill factor are achieved. The low-noise property is regarded as important in a visible light imaging device used for a VTR camera, and various improvements in sensitivity are achieved so that the interline CSD system is mainly used at present.

On the other hand, when an infrared imaging device forms a thermal image of an infrared light radiated from target whose temperature is near a room temperature, a small temperature change in a large background should be detected. In this case, a large maximum charge amount, a large fill factor, and low noise are required and, therefore, the CSD system is available. Hereinafter, a line-addressing pixel selecting method will be described using the CSD system infrared imaging device as an example, but the pixel selecting method may be applied to other line-addressing imaging devices, such as a MOS system imaging device, or imaging devices for other wavelength regions, such as a visible light imaging device.

FIG. 4 is a block diagram illustrating a CSD type infrared imaging device utilizing a Schottky-barrier diode as a photodetector. In FIG. 4, a pixel comprises a photodetector 21 utilizing a Schottky junction, a CSD 22 for transferring signal charges in the vertical direction, and a transfer gate 23 for transferring signal charges in the photodetector 21 to the CSD 22. Reference numeral 24 designates a CCD type horizontal shift register for transferring signal charges in the horizontal direction, numeral 25 designates an output amplifier for outputting signal charges, numeral 26 designates a transfer gate scanner (hereinafter referred to as TG scanner), numeral 27 designates an interlace circuit, and numeral 28 designates a CSD scanner. The gate electrodes of the transfer gate 23 and the CSD 22 are common, that is, there is only one gate electrode in a pixel. The gate electrodes arranged in the horizontal direction are electrically connected to each other by a vertical scanning line 7. A read pulse from the TG scanner 26 and the interlace circuit 27 and a transfer pulse from the CSD scanner 28 are applied to the vertical scanning line 7. In addition, a storage gate 29 and a storage control gate 30 are disposed between the CSD 22 and the horizontal CCD shift register 24.

FIG. 5 is a sectional view taken along a line V—V of the infrared imaging device of FIG. 4. In FIG. 5, reference numeral 1 designates a p type Si semiconductor substrate. Reference numeral 2 designates a light-to-electricity conversion layer produced by a Schottky junction between the substrate 1 and a metal electrode comprising, for example, platinum, palladium, iridium, platinum silicide, palladium silicide, iridium silicide, or the like. Reference numeral 3 designates a guard ring formed of an n type region, which relaxes the electric field concentration in the vicinity of the light-to-electricity conversion layer and reduces a dark current. Reference numeral 4 designates an n+ type region of the transfer gate 23 for transferring signal charges from the photodetector 21 to the CSD Reference numerals 5 and 6 designate an n type buried channel and a gate electrode of the CSD constituting a vertical shift register, respectively. In this structure, the gate electrode 6 serves both as an electrode of the transfer gate and a transfer electrode of the CSD. In addition, reference numeral 7 designates a vertical scanning line comprising aluminum, numeral 8 designates a field insulating film for separating and insulating elements from each other, numerals 9 and 10 designate inter-layer insulating films comprising oxide films or the like, numeral 11 designates an aluminum reflector disposed opposite the light-to-electricity conversion layer 2 on the inter-layer insulating film 10. The aluminum reflector 11 reflects infrared light transmitted through the light-to-electricity conversion layer 2 to the conversion layer 2.

A description is give of the operation.

An infrared light incident on the rear surface of the p type Si semiconductor substrate 1 is converted into signal charges in the light-to-electricity conversion layer 2 at the Schottky junction. The signal charges are stored in the Schottky junction. When a read pulse from the TG scanner 26 and the interlace circuit 27 is applied to the gate electrode 6, the stored signal charges are transferred to the n type buried channel 5. At this time, the signal charges are read out from the light-to-electricity conversion layer 2 and, at the same time, the light-to-electricity conversion layer 2 is reset to a voltage equivalent to the voltage of the read pulse. Thereafter, the light-to-electricity conversion layer 2 detects and accumulates optical signal charges until the next readout operation.

In the CSD system, a vertical scanning line 7 is selected by the TG scanner 26 and the interlace circuit 27. A read pulse is applied to gate electrodes 6 in a horizontal line and connected to the selected vertical scanning line 7, and then signal charges in the horizontal line are transferred to the n type buried channel 5. The interlace circuit 27 is designed to operate in a field integration mode, so that two adjacent two vertical scanning lines are selected at the same time. The line pair selected is altered field by field. Signal charges from two pixels selected are mixed together and spread over the CSD channel. When a vertical transfer pulse is applied from the CSD scanner 28 to the gate electrodes 6 via the vertical scanning lines 7, the signal charges spreading over the CSD channel are transferred in the vertical direction, collected in the storage gates 29, and temporarily stored therein. Preferably, four-phase clock pulses, which are conventionally used in CCDs, are employed as the vertical transfer pulses from the CSD scanner 28. This charge sweep-out operation is performed in a horizontal scanning period during the readout operation of the horizontal CCD 24. The signal charges collected in the storage gates 29 are transferred to the horizontal CCD 24 during the next horizontal blanking period. Then, the signal charges are transferred in the horizontal direction through the horizontal CCD 24 and output from the output amplifier 25 as video signals for one horizontal line.

Thereafter, the paler of the vertical scanning lines selected by the TG scanner 26 and the interlace circuit 27 are successively shifted by one stage while the same operation as described above is performed with respect to each line pair selected, whereby a video signal for an image plane of one field (hereinafter referred to as A field image plane) is obtained. In the next field, different pairs of the vertical scanning lines from those selected in the A field are selected while the same operation as described above is performed with respect to each line pair selected, whereby an image plane of the other field (hereinafter referred to as B field image plane) that fills up spaces between the vertical scanning lines of the A field image plane is obtained. Thus, a one frame image plane comprising the A field image plane and the B field image plane is displayed on a TV monitor. In a usual NTSC system TV, one frame is composed of two fields as described above.

When the gate electrode 6 serves both as the electrode of the transfer gate and the transfer electrode of the CSD as described above, the threshold voltage of the transfer gate should be higher than the "H" level of the vertical transfer pulse so that the transfer gate is not open while the vertical transfer pulse is applied. In addition, the aluminum reflector 11 reflects infrared light which is not absorbed but transmitted through the light-to-electricity conversion layer 2, and the reflected infrared light enters into the layer 2 again, thereby enhancing the sensitivity.

During the interlace operation in the field storage mode, two adjacent vertical scanning lines 7 are selected at the same time and the line pair is altered field by field, so that the photodetectors 21 store signal charges during a one-field period.

On the other hand, there is a frame storage mode interlace operation. In the frame storage mode, the vertical scanning lines are selected one by one. First, alternate vertical scanning lines are successively selected in the A field, and vertical scanning lines which were not selected in the A field are successively selected in the B field. Therefore, the photodetectors 21 store signal charges during a one-frame period. The field storage mode interlace circuit and the frame storage mode interlace circuit can be made from conventional MOS circuits.

FIG. 6 illustrates an example of the interlace circuit in the field storage mode. In FIG. 6, reference numeral 51 designates output lines T1 to Tn from the TG scanner 26 to the interlace circuit 27a, and numeral 52 designates vertical scanning lines L0 to Ln. An output line 51 is provided for two vertical scanning lines 52. The interlace circuit 27a comprises conventional n channel enhancement MOS transistors QE to QH.

A description is given of the line-addressing operation. The TG scanner 26 and the interlace circuit 27a operate during the horizontal blanking period. The TG scanner 26 supplies the output lines 51 with a pixel selection pulse $V_{TG}$ successively. Before the selection pulse is applied, all output lines 51 of the TG scanner 26 are at a voltage $V_{CR}$ lower than the selection pulse voltage $V_{TG}$, and the vertical scanning lines L0 to Ln are reset to a level determined by $V_{CR}$. When the selection pulse is output, the voltage $V_{TG}$ is applied to one of the output lines 51 of the TG scanner 26. At this time, the other output lines 51 remain at the low voltage $V_{CR}$.

A description is given of the operation in A field. In the A field, since $\phi FA$ is at "H" level and $\phi FB$ is at "L" level, the transistor switches QF and QG are closed and QE and QH are open. When the pixel selection pulse voltage $V_{TG}$ is applied to the output line T1 of the TG scanner 26, a voltage determined by $V_{TG}$ is applied to a pair of the vertical scanning lines L1 and L2, and the other vertical scanning lines are at a level determined by $V_{CR}$. When the TG scanner advances by one stage and the output lines T1 and T2 are set to $V_{CR}$ and $V_{TG}$, respectively, the selection pulse $V_{TG}$ is applied to a pair of the vertical scanning lines L3 and L4, and the other vertical scanning lines are at the level of $V_{CR}$. In this way, the pair of the vertical scanning lines, to which the selection pulse is applied, is successively shifted. When the TG scanner 26 reaches the final stage, it returns to the initial stage and then B field operation takes place. In the B field operation, since $\phi FB$ is at "H" level and $\phi FA$ is at "L" level, the transistor switches QE and QH are closed and QF and QG are open. Therefore, when the pixel selection pulse is applied to the output line T1 of the TG scanner 26, a pair of the vertical scanning lines L0 and L1 are set to $V_{TG}$, and when the pixel selection pulse is applied to the output line T2, a pair of the vertical scanning lines L2 and L3 are set to $V_{TG}$. In this way, different line pairs from those selected in the A field are successively selected in the B field.

On the other hand, in order to conduct the frame storage operation, the interlace circuit should be designed such that only the vertical scanning line L0 is selected when the selection pulse is applied to the output line T1 and only the vertical scanning line L2 is selected when the selection pulse is applied to the output line T2 during the A field operation, and only the vertical scanning line L1 is selected when the selection pulse is applied to the output line T1 and only the vertical scanning line L3 is selected when the selection pulse is applied to the output line T2 during the B field operation.

FIG. 7 illustrates an example of the frame storage mode interlace circuit. In FIG. 7, an output line 51 from the TG scanner 26 to the interlace circuit 27b is provided for two vertical scanning lines 52. The interlace circuit 27b comprises conventional n channel enhancement MOS transistors QJ to QM.

A description is given of the line-addressing operation. The TG scanner 26 and the interlace circuit 27a operate during the horizontal blanking period. The TG scanner 26 supplies the output lines 51 with a pixel selection pulse $V_{TG}$ successively. Before the selection pulse is applied, all output lines 51 of the TG scanner 26 are set to a voltage $V_{CR}$ lower than the voltage $V_{TG}$, and the vertical scanning lines L1 to Ln are reset to a level determined by $V_{CR}$. When the selection pulse is output, the voltage $V_{TG}$ is applied to one of the output lines of the TG scanner 26. At this time, the other output lines remain at the low voltage $V_{CR}$.

A description is given of the operation in A field. In the A field, since $\phi FA$ is at "H" level and $\phi FB$ is at "L" level, the transistor switches QL and QK are closed and QJ and QM are open. Therefore, the vertical scanning lines L2 and L4 are connected to the output lines T1 and T2, respectively, and the vertical scanning lines L1 and L3 are connected to the $V_{CR}$ power supply. When the pixel selection pulse $V_{TG}$ is applied to the output line T1 of the TG scanner 26, a voltage determined by $V_{TG}$ is applied to the vertical scanning line L2, and the other vertical scanning lines 52 are at a level determined by $V_{CR}$. When the TG scanner advances by one stage and the output lines T1 and T2 are set to the levels of $V_{CR}$ and $V_{TG}$, respectively, the selection pulse $V_{TG}$ is applied to the vertical scanning line L4, and the other vertical scanning lines are at the level of $V_{CR}$. In this way, the vertical scanning line, to which the selection pulse is applied, is shifted. When the TG scanner 26 reaches the final stage, it returns to the initial stage and then a B field operation takes place. In the B field operation, since $\phi FB$ is at "H" level and $\phi FA$ is at "L" level, the transistor switches QJ and QM are closed and QK and QL are open. Therefore, the vertical scanning lines L1 and L3 are connected to the output lines T1 and T2, respectively, and L2 and L4 are connected to the $V_{CR}$ power supply. When the pixel selection pulse is applied to the output line T1 of the TG scanner 26, only the vertical scanning line L1 is set to the level of $V_{TG}$. When the pixel selection pulse is applied to the output line T2, only the vertical scanning line L3 is set to the level of $V_{TG}$. In this way, the vertical scanning lines which were not selected in the A field are successively selected in the B field.

As described above, in the CSD and MOS systems, different from the interline CCD system, the saturation charge is not determined by the maximum charge transfer capacity of the vertical charge transfer device but by the charge storage capacity of the detector, so that a large saturation charge is achieved. Therefore, in the CSD and MOS systems, a large saturation charge is obtained by the field storage operation. More specifically, in the field storage operation, two vertical scanning lines are selected and signals for two pixels are mixed and read out at the same time, so that the saturation charge is determined by the charge storage capacities of detectors of two pixels. On the other hand, in the frame storage operation, only one vertical scanning line is selected at one time, so that the saturation charge is half of the saturation charge in the field storage operation.

A solid-state infrared imaging device is mainly used for thermal imaging of a target in an environment near room temperature. Since the amount of infrared light radiated from the background at the room temperature is large, the background signal significantly increases during the imaging in a room temperature background. In this case, the infrared imaging device is required to have a large saturation charge so that its output is not saturated due to the large background signal. Therefore, the field storage mode interlace operation is usually employed for thermal imaging in a room temperature background. On the other hand, the frame storage mode interlace operation has an advantage over the field storage mode interlace operation when a small target is detected with a low background temperature i.e., a small background signal. In this case, since the background signal is small, the small saturation charge of the frame storage mode operation causes no problem. When a target to be detected is far and focused into an image smaller than the pixel size, the signal from the target is unfavorably mixed into the background signals of two pixels in the field storage mode operation in which signals of two pixels are mixed and read out together. However, in the frame storage mode operation, the signal from the target is mixed into a background signal of only one pixel. Therefore, the frame storage mode operation is superior to the field storage mode operation in a discrimination between a signal of a pixel on which an image of the target is focused and signals of other pixels. As described above, in infrared imaging, the field storage mode interlace operation with the large saturation charge usually has an advantage over the frame storage mode interlace operation, but there are some cases where the frame storage mode interlace operation has an advantage depending on background conditions and objects. In addition, there are some cases where non-interlace operation has an advantage. Although an infrared imaging device is employed as an example in the above description, also in cases of other imaging devices, such as a visible light imaging device or an ultraviolet imaging device, optimum interlace systems for those imaging devices differ according to the background conditions and the objects.

In the conventional line-addressing type solid-state imaging devices, however, since the interlace operation is restricted by the circuit structure of the pixel selecting circuit, the optimum interlace system should be chosen in accordance with expected background conditions and objects when the pixel selecting circuit is designed. The interlace system cannot cope with variations in the background conditions and the objects.

SUMMARY OF THE INVENTION

An object of the present invention is to provide a line-addressing type solid-state imaging device which selects an optimum interlace system in accordance with background conditions and objects through an external control signal.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to a first aspect of the present invention, a line-addressing type solid-state imaging device includes a TG scanner successively outputting a pixel selection pulse, an interlace circuit receiving the pixel selection pulse from the TG scanner and converting the pixel selection pulse to a field storage mode pixel selection pulse, and an interlace switching circuit for switching the field storage mode pixel selection pulse between a field storage mode and a frame storage mode in response to an external control signal, which is disposed between the interlace circuit and the vertical scanning lines. Therefore, the solid-state imaging device can select an optimum interlace system according to background conditions and objects.

According to a second aspect of the present invention, a line-addressing type solid-state imaging device includes a TG scanner successively outputting a pixel selection pulse, an interlace circuit receiving the pixel selection pulse from the TG scanner and converting the pixel selection pulse to a frame storage mode pixel selection pulse, and an interlace switching circuit for switching the frame storage mode pixel selection pulse between a field storage mode and a frame storage mode in response to an outside control signal which is disposed between the interlace circuit and the vertical scanning lines. Therefore, the solid-state imaging device can select an optimum interlace system according to background conditions and objects.

DETAILED DESCRIPTION OF THE PREFERRED EMBODIMENTS

Figure 1:
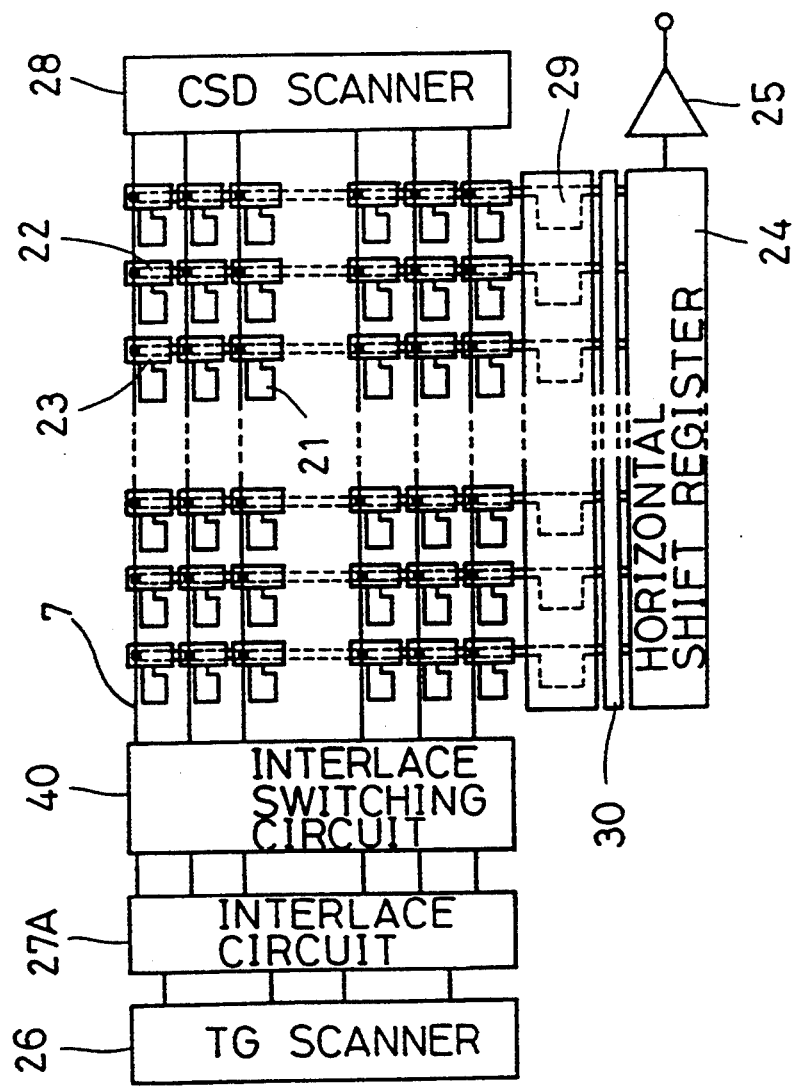
FIG. 1 is a block diagram illustrating a solid-state infrared imaging device in accordance with a first embodiment of the present invention.

FIG. 1 is a block diagram illustrating a solid-state infrared imaging device in accordance with a first embodiment of the present invention. A cross section of a pixel region is the same as the conventional one shown in FIG. 5. In FIG. 1, the same reference numerals as in FIG. 4 designate the same or corresponding parts.

Figure 4:
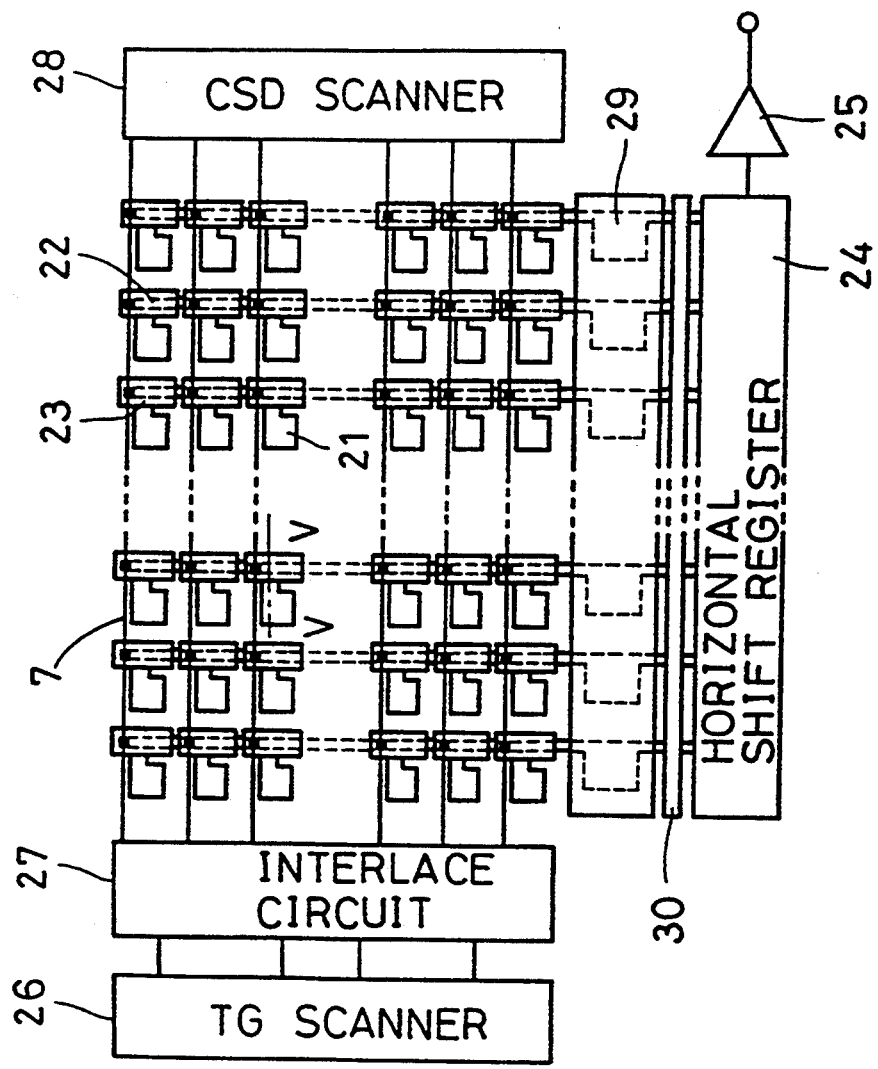
FIG. 4 is a block diagram illustrating a solid-state infrared imaging device in accordance with the prior art.

The structure shown in FIG. 1 is identical to the conventional structure shown in FIG. 4 except that an interlace switching circuit 40 is disposed between the interlace circuit 27A and the vertical scanning lines 7.

Figure 5:
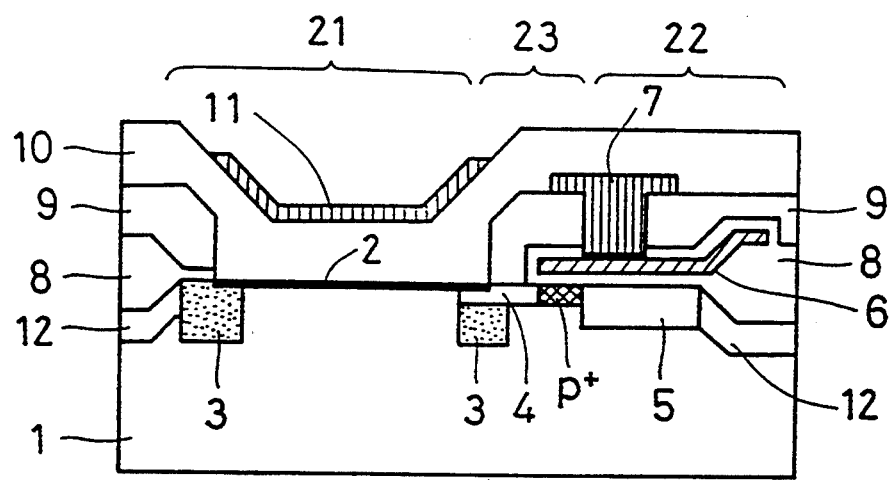
FIG. 5 is a sectional view taken along a line V—V of FIG. 4.

The fundamental operation of the infrared imaging device of this embodiment is identical to the operation already described with respect to FIGS. 4 and 5 and, therefore, does not require repeated description.

A description is given of a fundamental structure of the interlace switching circuit 40. A transistor circuit is disposed between output lines of the field storage interlace circuit 27A and the vertical scanning lines 7. In the field storage mode, transistors included in the transistor circuit are closed, so that the output lines of the interlace circuit 27A are connected to the vertical scanning lines 7. In the frame storage mode, the transistors are selectively closed so that alternating output lines of the interlace circuit 27A are connected to the vertical scanning lines and the vertical scanning lines which are not connected to the output lines may be connected to a power supply voltage. The connection and non-connection of the vertical scanning lines are altered at every field.

Figure 2:
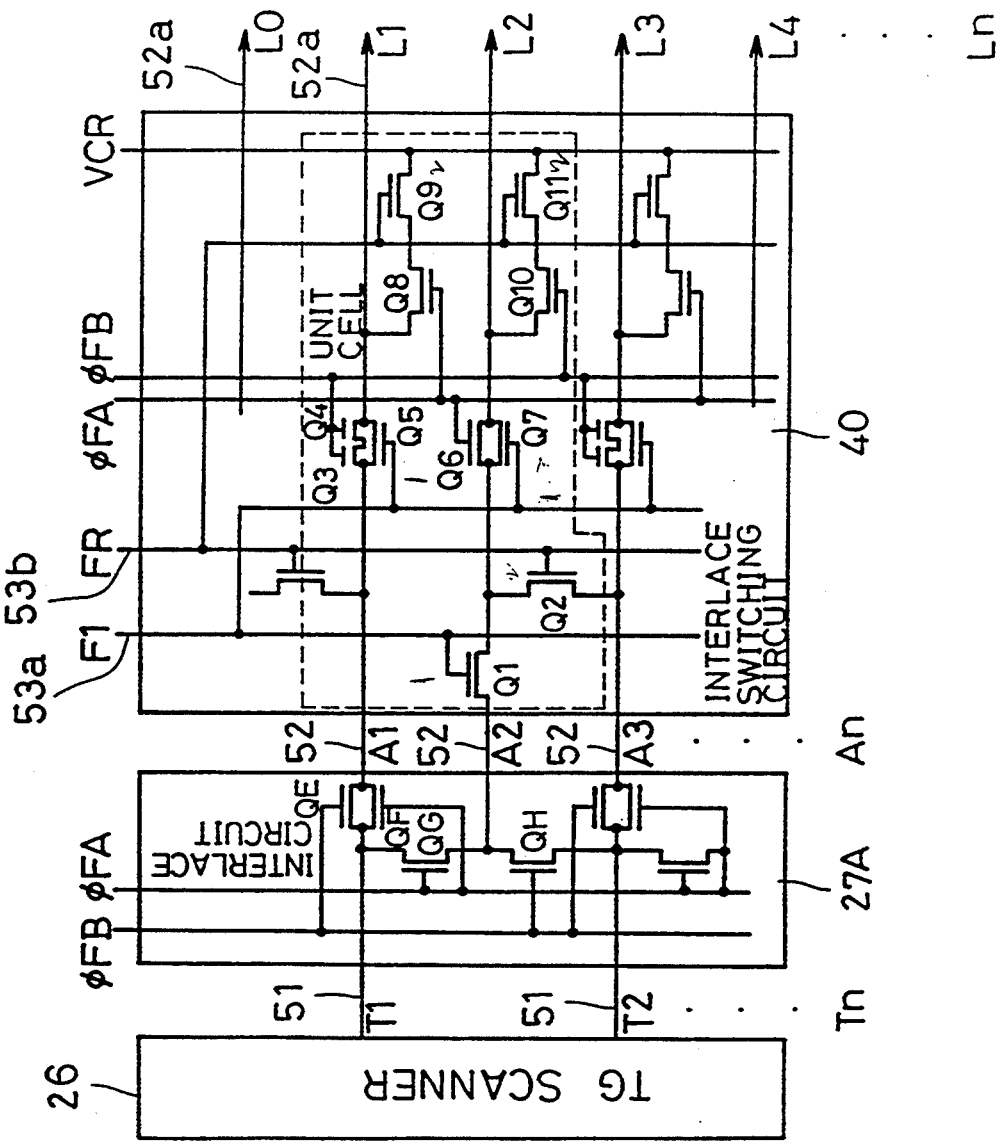
FIG. 2 is a block diagram illustrating circuit structures of an interlace switching circuit and an interlace circuit in accordance with the first embodiment of the present invention.
Figure 6:
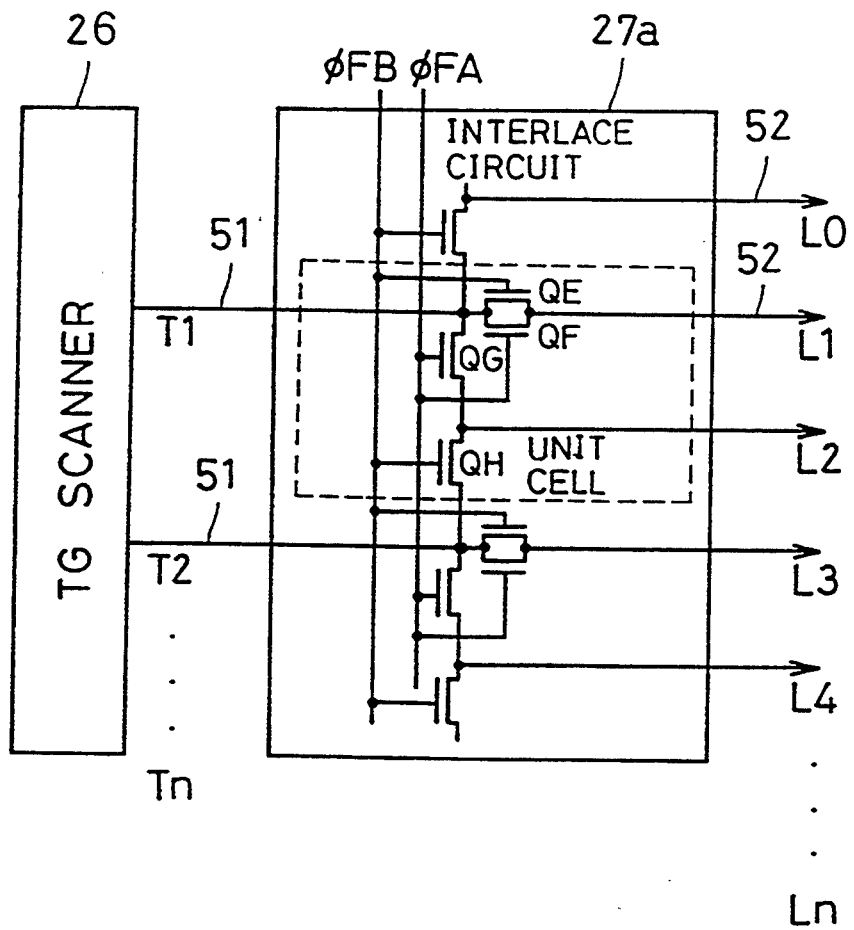
FIG. 6 is a block diagram illustrating an interlace circuit for field storage mode interlace operation in accordance with the prior art.

The interlace switching circuit 40 will be described in more detail with reference to FIG. 2. In FIG. 2, the interlace circuit 27A comprises MOS transistors QE, QF, QG, and QH and this is the same as the conventional interlace circuit 27a shown in FIG. 6. The drains of the transistors QE, QF, QG, and QH, which are connected to the vertical scanning lines L1, L2, L3, ... . Ln in FIG. 6, are connected to the output lines A1, A2, A3, ... An of the interlace circuit 27A in FIG. 2, and the output lines A1, A2, A3, comprising transistors Q1 to Q11. A pixel selection pulse corresponding to the field storage mode interlace system is successively applied to the output lines A1, A2, A3, ... An of the interlace circuit 27A. Reference numerals 53a and 53b designate control pins F1 and FR for switching the interlace operation between the field storage mode and the frame storage mode.

A description is given of the interlace switching operation. In the field storage mode, the control pins F1 53a and FR 53b are set to "H" level and "L" level, respectively. At this time, the transistors Q1, Q5, and Q7 are closed and Q2, Q9, and Q11 are open. In an A field, $\phi$FA is at "H" level and $\phi$FB is at "L" level, so that the transistor switches QF and QG are closed and QE and QH are open. When the pixel selection pulse $V_{TG}$ is applied to the output line T1 of the TG scanner 26, a voltage determined by $V_{TG}$ is applied to the output lines A1 and A2 of the interlace circuit 27A, and the other output lines are at a level determined by $V_{CR}$. Since the transistors Q1, Q5, and Q7 are closed, the pixel selection pulse $V_{TG}$ is applied to the pair of vertical scanning lines L1 and L2, and the other vertical scanning lines are at the level of $V_{CR}$. When the TG scanner 26 advances by one stage and the output lines T1 and T2 of the TG scanner 26 are at the levels of $V_{CR}$ and $V_{TG}$, respectively, the voltage determined by $V_{TG}$ is applied to the output lines A3 and A4 (not shown), and the other output lines are at the level of $V_{CR}$. Therefore, the pixel selection pulse $V_{TG}$ is applied to a pair of the vertical scanning lines L3 and L4. In this way, the pair of the vertical scanning lines to which the pixel selection pulse is applied is successively shifted. When the TG scanner 26 reaches the final stage, it returns to the initial stage and then a B field operation takes place.

In the B field, since $\phi$FB is at "H" level and $\phi$FA is at "L" level, the transistor switches QE and QH are closed and QF and QG are open. Therefore, when the pixel selection pulse $V_{TG}$ is applied to the output line T1 of the TG scanner 26, the output lines A0 and A1 Of the interlace circuit 27A are at the level of $V_{TG}$. At this time, since the transistors Q1, Q5, and Q7 connected to the control pin 53a are closed, the pair of the vertical scanning lines L0 and L1 are at the level of $V_{TG}$. When the pixel selection pulse is applied to the output line T2, a pair of the vertical scanning lines L2 and L3 are at the level of $V_{TG}$. In this way, different line pairs from those selected in the A field are selected in the B field.

On the other hand, in the frame storage mode the control pins F1 and FR are set to "L" level and "H" level, respectively. At this time, the transistors Q2, Q9, and Q11 are closed and Q1, Q5, and Q7 are open. In an A field, since $\phi FA$ is at "H" level and $\phi FB$ is at "L" level, the transistor switches QF and QG are closed and QE and QH are open. When the pixel selection pulse $V_{TG}$ is applied to the output line T1 of the TG scanner 26, a voltage determined by $V_{TG}$ is applied to the output lines A1 and A2 of the interlace circuit 27A, and the other output lines are at the level determined by $V_{CR}$. Since the transistor Q1 is open, the selection pulse applied to the output line A2 does not reach a vertical scanning line 7. The pixel selection pulse applied to the output line A1 is applied to the vertical scanning line L0 via transistors Q2 and Q6 in a one-stage upper unit cell (not shown) which are closed because $\phi FA$ is at "H" level. At this time, the vertical scanning lines L1, L3, and the like, which are connected to the transistor Q8, are kept at the level of $V_{CR}$ via the transistors Q8 and Q9, and the vertical scanning lines L2 and the like, which are connected to the transistor Q10, are kept at the level of $V_{CR}$ via the transistors Q2 and Q6 because the output lines A3 and the like are at the level of $V_{CR}$. When the TG scanner 26 advances by one stage and the output lines T1 and T2 are set to the levels of $V_{CR}$ and $V_{TG}$, respectively, the pixel selection pulse $V_{TG}$ is applied to the output lines A3 and A4, and the other output lines are at the level of $V_{CR}$. Accordingly, the pixel selection pulse $V_{TG}$ is applied to the vertical scanning line L2, and the other scanning lines are at the level of $V_{CR}$. Thus, in the A field, the vertical scanning lines L1, L3, and the like connected to the transistor Q8 are kept at the level of $V_{CR}$ via the transistors Q8 and Q9, and the pixel selection pulse is successively applied to the vertical scanning lines L0, L2, L4, and the like because these scanning lines are connected to the output lines A1, A3, and the like via the transistors Q2 and Q6. When the TG scanner 26 reaches the final stage, it returns to the initial stage and then a B field operation takes place.

In the B field operation, the vertical scanning lines L0, L2, L4, and the like, which are connected to the transistor Q10, are kept at the level of $V_{CR}$ via the transistors Q10 and Q11, and the pixel selection pulse is successively applied to the vertical scanning lines L1, L3, and the like from the output lines A1, A3, and the like via the transistors Q3 and Q4.

Thus, in the B field, different vertical scanning lines from those selected in the A field are selected. In addition, the transistors Q3 and Q4 are included so as to equalize the number of transistors connecting the output lines 52 to the vertical scanning lines 52a between the A field and the B field, and the pair of transistors Q3 and Q4 serve equally as a transistor.

As described above, in the interlace switching circuit 40 of this embodiment, the field storage mode pixel selection signal can be switched between the field storage mode and the frame storage mode by switching between "H" and "L" an external control signal applied to the control pins F1 and FR.

According to the above-described first embodiment, the line-addressing type solid-state imaging device includes the TG scanner for outputting the pixel selection pulse, the interlace circuit for converting the pixel selection pulse from the TG scanner to the field storage mode pixel selection pulse, and the interlace switching circuit for switching the field storage mode pixel selection pulse between the field storage mode and the frame storage mode, which is disposed between the interlace circuit and the vertical scanning lines. The switching of the pixel selection signal between the field storage mode and the frame storage mode is controlled by an external control signal. Therefore, the solid-state imaging device can select an optimum interlace system according to the background conditions and the objects.

In the above-described first embodiment, the field/frame interlace switching circuit 40 is disposed between the field storage mode interlace circuit 27A and the vertical scanning lines 52a, but the interlace circuit 27A may be designed to for a frame storage operation and the field/frame interlace switching circuit may be disposed between the frame storage mode interlace circuit and the vertical scanning lines. In this case, the interlace switching circuit is constituted as described below. That is, a transistor circuit is disposed between output lines 52 of the frame storage mode interlace circuit and the vertical scanning lines 52a. In the frame storage mode, transistors between the output lines 52 of the interlace circuit and the vertical scanning lines 52a are closed, so that the output lines 52 are connected to the scanning lines 52a. In the field storage mode, the transistors are selectively closed so that alternating output lines of the interlace circuit, to which the pixel selection pulse is successively applied, may be connected to the vertical lines and, at this time, two adjacent vertical lines may be connected to each output line of the interlace circuit. In the next field, the transistors are selectively closed so that the output lines of the interlace circuit to which the pixel selection pulse was not applied in the previous field are connected to the vertical lines and, at this time, a different pair of two adjacent two vertical lines from those selected in the previous field are connected to each output line of the interlace circuit.

Figure 3:
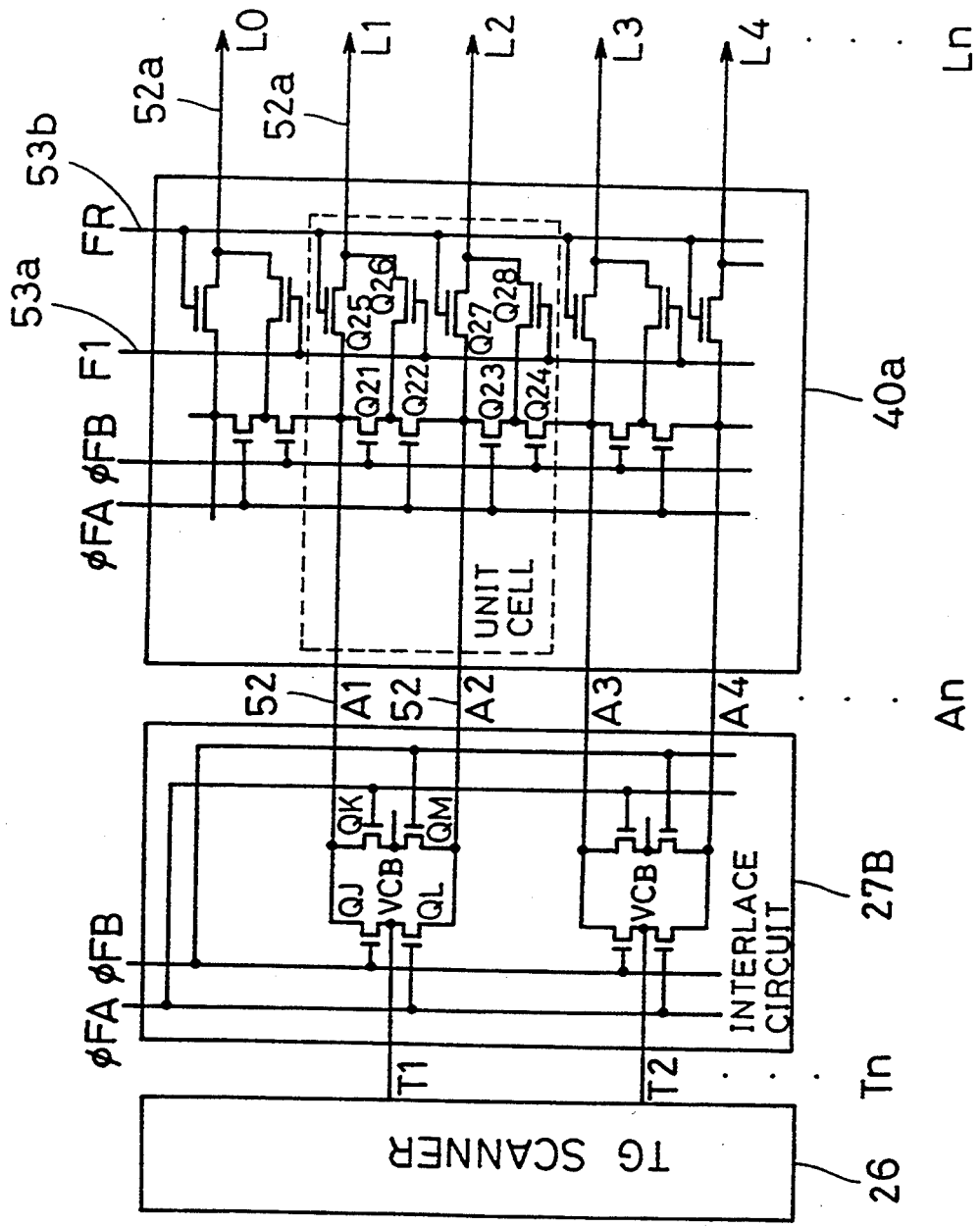
FIG. 3 is a block diagram illustrating circuit structures of an interlace switching circuit and an interlace circuit in accordance with a second embodiment of the present invention.
Figure 7:
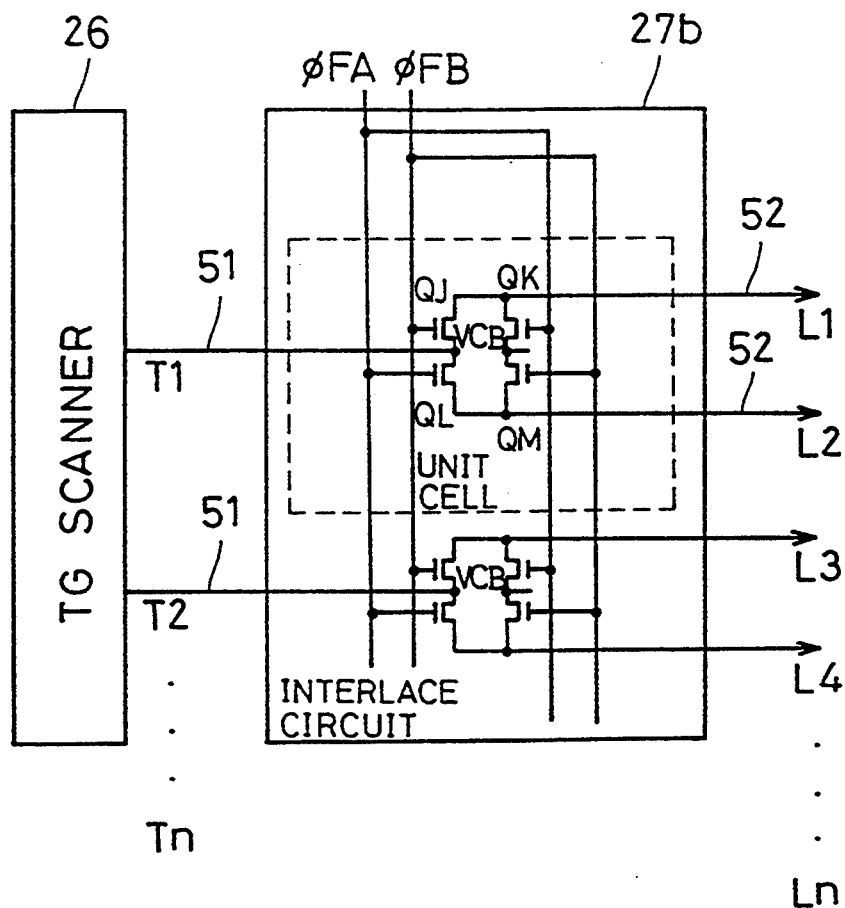
FIG. 7 is a block diagram illustrating an interlace circuit for a frame storage mode interlace operation in accordance with the prior art.

The structure of the interlace switching circuit will be described in more detail with reference to FIG. 3. In FIG. 3, the same reference numerals as in FIG. 2 designate the same or corresponding parts. An interlace circuit 27B comprising MOS transistors QJ, QK, QL, and QM is identical to the interlace circuit of FIG. 7. The drains of the transistors QJ, QK, QL, and QM, which are connected to the vertical scanning lines L1, L2, L3, L4, . . . Ln in FIG. 7, are connected to the output lines A1, A2, A3, A4, . . . An of the interlace circuit 27B in FIG. 3, and the interlace switching circuit 40a comprising transistors Q21 to Q28 is connected to the output lines of the interlace circuit 27B. A pixel selection pulse according to the frame storage mode interlace system is applied to the output lines A1, A2, A3, A4, . . . An of the interlace circuit 27B. Reference numerals 53a and 53b designate control pins F1 and FR for switching the interlace system between the field storage mode and the frame storage mode.

A description is given of the interlace switching operation. In the field storage mode, the control pins F1 and FR are set at "H" level and "L" level, respectively. At this time, the transistors Q26 and Q28 are closed and Q25 and Q27 are open. In an A field, since $\phi FA$ is at "H" level and $\phi$FB is at "L" level, the transistor switches QL and QK are closed and QJ and QM are open. In addition, transistors Q22 and Q23 are closed and Q21 and Q24 are open. When the pixel selection pulse $V_{TG}$ is applied to the output line T1 of the TG scanner 26, a voltage determined by $V_{TG}$ is applied to the output line A2 of the interlace circuit 27A, and the other output lines are at a level determined by $V_{CR}$. Since the transistors Q22 and Q26 are closed, the output line A2 is connected to the vertical scanning line L1. In addition, since the transistors Q23 and Q28 are closed, the output line A2 is also connected to the vertical scanning line L2. Therefore, the pixel selection pulse $V_{TG}$ from the output line A2 is applied to the pair vertical scanning lines L1 and L2, and the other vertical scanning lines are at the level of $V_{CR}$. At this time, the vertical scanning lines L3 and L4 are connected to the output line A4. When the TG scanner 26 advances by one stage and the output lines T1 and T2 of the TG scanner 26 are at the levels of $V_{CR}$ and $V_{TG}$, respectively, the pixel selection pulse $V_{TG}$ is applied to the output line A4, and the other output lines are at the level of $V_{CR}$. Therefore, the pixel selection pulse $V_{TG}$ is applied to the pair of vertical scanning lines L3 and L4. In this way, the pair of vertical scanning lines, to which the pixel selection pulse is applied, is successively shifted. When the TG scanner reaches the final stage, it returns to the initial stage and then a B field operation takes place.

In the B field, since $\phi$FB is at "H" level and $\phi$FA is at "L" level, the transistor switches QJ and QM are closed and QK and QL are open. In addition, transistors Q21 and Q24 are closed and Q22 and Q23 are open. Since the transistors Q21, Q24, Q26, and Q28 are closed, the output line A1 is connected to the pair of the vertical scanning lines L0 and L1, and the output line A3 is connected to the pair of the vertical scanning lines L2 and L3. When the pixel selection pulse $V_{TG}$ is applied to the output line T1 of the TG scanner 26, a voltage determined by $V_{TG}$ is applied to the output line A1 of the interlace circuit 27A, and the other output lines are at the level determined by $V_{CR}$. Therefore, the pixel selection pulse $V_{TG}$ from the output line A1 is applied to the pair of the vertical scanning lines L0 and L1, and the other scanning lines are at the level of $V_{CR}$. When the TG scanner 26 advances by one stage and the output lines T1 and T2 are set at levels of $V_{CR}$ and $V_{TG}$, respectively, the pixel selection pulse $V_{TG}$ is applied to the output line A3, and the other output lines are at the level of $V_{CR}$. Therefore, the pixel selection pulse $V_{TG}$ is applied to the pair of vertical scanning lines L2 and L3. In this way, the pair of vertical scanning lines to which the pixel selection pulse is applied is successively shifted. In the B field, different pairs from those selected in the A field are selected.

In the frame storage mode operation, the control pins F1 and FR are set at "L" level and "H" level, respectively. At this time, the transistors Q25 and Q27 are closed and Q26 and Q28 are open. Therefore, the output line A1 is connected to the vertical scanning line L1 via the transistor Q25, and the output line A2 is connected to the vertical scanning line L2 via the transistor Q27. Similarly, the output lines A3 and A4 are connected to the vertical scanning lines L3 and L4, respectively. In this way, the output lines of the frame storage mode interlace circuit 27A are horizontally connected to the vertical scanning lines for frame storage operation.

As described above, in the interlace switching circuit 40a of this embodiment, the frame storage mode pixel selection signal is switched between the field storage mode and the frame storage mode by switching between "H" and "L" an external control signal applied to the control pins F1 and FR.

In the above-described embodiments of the present invention, the Schottky junction type infrared detectors are employed as photodetectors and the CSD system is employed for the readout operation in the vertical direction. However, other kinds of photodetectors or photodetectors converting other wavelength light, such as visible light, may be employed, and other line-addressing type signal readout systems, such as an MOS system, may be employed. In the MOS system, transistors are connected to output ends of photodetectors and the signal readout operation is carried out by ON-OFF switching of the transistors.

As is evident from the foregoing description, according to the present invention, a line-addressing type solid-state imaging device includes a TG scanner successively outputting a pixel selection pulse, an interlace circuit receiving the pixel selection pulse from TG scanner and converting the pixel selection pulse to a field storage mode pixel selection pulse or a frame storage mode pixel selection pulse, and an interlace switching circuit for switching the field or frame storage mode pixel selection pulse between a field storage mode and a frame storage mode which is disposed between the interlace circuit and the vertical scanning lines. The switching between the frame storage mode and the field storage mode is controlled by an external control signal. Therefore, the solid-state imaging device can select a optimum interlace system according to background conditions and objects being imaged.

What is claimed is:

1. A solid-state imaging charge sweep device (CSD) comprising:
   a two-dimensional array of photodetectors for generating and storing signal charges in response to incident light, said photodetectors in said array being arranged along a plurality of horizontal directions and vertical directions the horizontal directions being orthogonal to the vertical directions, each of said photodetectors including a gate for controlling transfer of signal charges from the respective photodetectors and including a plurality of vertical scanning lines, each vertical scanning line being connected to each of said gates of said photodetectors lying on one of the horizontal directions;
   a transfer gate scanner for sequentially outputting selection pulses applied to respective vertical scanning lines for reading out stored signal charges from said photodetectors connected to the respective vertical scanning line;
   a field storage mode interlace circuit receiving the selection pulses from said transfer gate scanner for converting the selection pulses to field storage mode selection pulses for operating said CSD in a field storage mode in which adjacent pairs of vertical scanning lines simultaneously receive selection pulses and for outputting the field storage mode pulses; and
   an interlace switching circuit receiving the field storage mode pulses from said field storage mode interlace circuit and connected to said vertical scanning lines for switching operation of said CSD between the field storage mode and a frame storage mode in which alternating pairs of said vertical scanning lines simultaneously receive selection pulses in response to a mode control signal applied to said interlace switching circuit.

2. A solid-state imaging charge sweep device (CSD) comprising:
a two-dimensional array of photodetectors for generating and storing signal charges in response to incident light, said photodetectors in said array being arranged along a plurality of horizontal directions and vertical directions, the horizontal directions being orthogonal to the vertical directions, each of said photodetectors including a gate for controlling transfer of signal charges from the respective photodetectors, and including a plurality of vertical scanning lines, each vertical scanning line being connected to each of said gates of said photodetectors lying on one of the horizontal directions;
a transfer gate scanner for sequentially outputting selection pulses applied to respective vertical scanning lines for reading out stored signal charges from said photodetectors connected to the respective vertical scanning line;
a frame storage mode interlace circuit receiving the selection pulses from said transfer gate scanner for converting the selection pulses to frame storage mode selection pulses for operating said CSD in a frame storage mode in which alternating pairs of vertical scanning lines simultaneously receive selection pulses and for outputting the frame storage mode pulses; and
an interlace switching circuit receiving the frame storage mode pulses from said frame storage mode interlace circuit and connected to said vertical scanning lines for switching operation of said CSD between the frame storage mode and a field storage mode in which adjacent pairs of vertical scanning lines simultaneously receive selection pulses in response to a mode control signal applied to said interlace switching circuit.

3. The solid-state imaging CSD of claim 1 wherein said field storage mode interlace circuit includes a plurality of output lines and said interlace switching circuit comprises a transistor circuit comprising a plurality of transistors disposed between said output lines of said field storage mode interlace circuit and said vertical scanning lines of said two-dimensional photodetector array, said transistors between said output lines of said field storage mode interlace circuit and said vertical scanning lines being selectively closed during field storage mode operation so that said output lines are connected to corresponding vertical scanning lines, said transistors being selectively closed during frame storage mode operation so that alternating output lines of said field storage mode interlace circuit are selected and connected to corresponding vertical scanning lines and vertical scanning lines corresponding to the output lines not selected are connected to a power supply voltage, the connection of said vertical scanning lines and output lines being sequentially altered.

4. The solid-state imaging CSD of claim 2 wherein said frame storage mode interlace circuit includes a plurality of output lines and said interlace switching circuit comprises a transistor circuit comprising a plurality of transistors disposed between said output lines of said frame storage mode interlace circuit and said vertical scanning lines of said two-dimensional photodetector array, said transistors between said output lines of said frame storage mode interlace circuit and said vertical scanning lines being selectively closed during frame storage mode operation so that said output lines are connected to corresponding vertical scanning lines, said transistors being selectively closed during field storage mode operation so that said output lines of said frame storage mode interlace circuit to which the frame storage mode selection pulses are successively applied are connected to said vertical scanning lines, two adjacent vertical scanning lines being connected to respective output lines, and said transistors being selectively, sequentially closed so that said output lines of said frame storage mode interlace circuit which the frame storage mode selection pulses are not applied in one field are connected to said vertical scanning lines and two adjacent vertical scanning lines different from those previously connected are connected to the output lines to which the frame storage mode selection pulses are applied.

* * * * *

UNITED STATES PATENT AND TRADEMARK OFFICE
CERTIFICATE OF CORRECTION

PATENT NO. : 5,444,484
DATED : August 22, 1995
INVENTOR(S) : Yutani et al.

It is certified that error appears in the above-indentified patent and that said Letters Patent is hereby corrected as shown below:

Column 12, Line 43, after "directions" (first occurrence) insert --,---;

Line 47, after "photodetectors" insert --,--.

Signed and Sealed this

Twelfth Day of March, 1996

Attest:

BRUCE LEHMAN

Attesting Officer     Commissioner of Patents and Trademarks